United States Patent [19]
Benjey

[11] Patent Number: 6,035,883
[45] Date of Patent: Mar. 14, 2000

[54] WELDABLE VAPOR VENT VALVE FOR FUEL TANKS

[75] Inventor: Robert P. Benjey, Dexter, Mich.

[73] Assignee: Eaton Corporation, Cleveland, Ohio

[21] Appl. No.: 09/041,713

[22] Filed: Mar. 13, 1998

[51] Int. Cl.$^7$ ................................................. F16K 24/04
[52] U.S. Cl. ............................................ 137/202; 137/43
[58] Field of Search ...................................... 137/43, 202

[56] References Cited

U.S. PATENT DOCUMENTS

| | | |
|---|---|---|
| 4,413,804 | 11/1983 | Lanius et al. . |
| 4,779,637 | 10/1988 | Ubaldi . |
| 5,139,043 | 8/1992 | Hyde et al. . |
| 5,404,907 | 4/1995 | Benjey et al. . |
| 5,518,018 | 5/1996 | Roetker ...................................... 137/43 |
| 5,666,989 | 9/1997 | Roetker ................................ 137/202 X |
| 5,687,753 | 11/1997 | Doll ............................................ 137/43 |
| 5,694,968 | 12/1997 | Devall et al. ............................ 137/202 |
| 5,749,347 | 5/1998 | Torii et al. ............................ 137/43 X |
| 5,775,362 | 7/1998 | Sato et al. ................................ 137/202 |

Primary Examiner—Gerald A. Michalsky
Attorney, Agent, or Firm—Young & Basile, P.C.

[57] ABSTRACT

An improved weldable vapor vent valve assembly comprising a non-weldable (heat-resistant) valve body and a weldable connector portion attached to an upper end of the valve body for welding onto the outer surface of a polymeric fuel tank. The weldable connector portion secures the valve body in place using vertical anti-leak ribs extending downwardly from the weldable connector and upwardly from the valve body which mate axially in an interlocking, sealing fit. The anti-leak ribs form a labyrinth-type seal that prevents liquid fuel and fuel vapor from leaking between the assembled portions of the vent valve assembly.

9 Claims, 2 Drawing Sheets

WELDABLE VAPOR VENT VALVE FOR FUEL TANKS

FIELD OF THE INVENTION

The present invention is in the field of vent valves capable of being welded to polymeric fuel tanks, and more specifically relates to weldable vapor vent valves of the type having two joined portions formed from dissimilar materials, one of which is weldable to the fuel tank, the other of which is heat- and vapor-resistant.

BACKGROUND OF THE INVENTION

Automotive manufacturers are increasingly forming automotive fuel tanks from polymeric materials (hereafter "plastics"), for example polyethylene, to take advantage of efficient manufacturing processes such as blow molding. Vapor venting valves are typically needed in or on the tank to vent fuel vapor from the tank. Properly sealing such valves to prevent fuel and fuel vapor from leaking to the surroundings is always an important consideration.

Valves used with plastic fuel tanks are preferably welded to the tank, for example using hot-plate welding techniques where the mating tank and valve surfaces are heated and brought into contact under a compressive force until the surfaces bond. There are two major problems associated with welding valves to the tank. First, the materials which lend themselves to being welded to plastic fuel tanks, i.e. materials similar to those used in the fuel tanks, are often not suitable for making quality vent valves because they are too soft, subject to long term creep problems, and susceptible to damage from the heat in the welding process. However, harder, higher-melting temperature plastic materials such as nylon which are suitable for use in the valve body are difficult if not impossible to weld to the plastic used for the fuel tanks. For example, polyethylene and nylon simply do not weld very well due to their different melting temperatures and other properties.

U.S. Pat. No. 5,404,907 issued to Benjey et al. illustrates one solution to the above problems by providing an efficient connection and sealing arrangement between a weldable connector portion and a non-weldable valve body.

In a first embodiment of U.S. Pat. No. 5,404,907, a standard, non-weldable vent valve includes a main valve body having a lower portion for insertion through an aperture in the fuel tank wall to extend into the fuel tank, and an upper portion positioned above the fuel tank when the valve is inserted. A weldable connector is connected to the upper portion of the valve body so that at least a portion of the weldable connector is in position for welding to the fuel tank when the vent valve is positioned in the fuel tank aperture. The weldable connector is overmolded onto the upper portion of the valve body. The valve body includes a plurality of circumferential, horizontal anti-leak ribs on its exterior. The ribs enhance the connection between the overmolded weldable connector portion and the upper portion of the valve body, and further provide a circuitous, labyrinth-type flow-restricting interface between the weldable connector and the valve body to prevent leakage of fuel and vapor between them.

Referring to FIG. 1 of U.S. Pat. No. 5,404,907, a heat-resistant vent valve body 20 has a lower portion 22 inserted through aperture 11 in fuel tank wall 10. An upper portion 24 of the valve body extends above fuel tank wall 10 and includes horizontal anti-leak ribs 34. A weldable connector 38 is overmolded on valve body 20, flowing around and between ribs 34 during the molding process to create a strong connection between them. Ribs 34 also provide a labyrinth type flow-restricting interface seal between valve body 20 and weldable connector 38 to prevent liquid fuel and fuel vapor leakage. Weldable connector 38 is welded to fuel tank wall 10 with weld feet 42 of known type.

SUMMARY OF THE INVENTION

In general the present invention is considered an improvement over the overmolded anti-leak rib structure of U.S. Pat. No. 5,404,907, in that the need for overmolding the weldable connector onto the valve body is eliminated. In general the invention is achieved by replacing the overmolded connector and anti-leak rib structure of the '907 patent with sets of vertical, interlocking ribs on the weldable connector and the valve body, providing a simple push-fit connection between the two pieces for assembly prior to welding to the fuel tank. In a preferred form, the softer ribs extending downwardly from the weldable connector are each trapped between two of the harder, non-weldable ribs extending upwardly from the valve body with a fluid- and vaportight interference fit.

These and other features of the present invention will become apparent upon further reading of the specification in light of the accompanying drawings.

BRIEF DESCRIPTION OF THE ILLUSTRATED EMBODIMENT

FIG. 1 is a side section view of a prior art overmolded vent valve and weldable connector structure according to U.S. Pat. No. 5,404,907, connected to a fuel tank; and FIG. 2 is a side section view of a vent valve and weldable connector structure according to the present invention, connected to a fuel tank.

DETAILED DESCRIPTION OF THE INVENTION

Figure 1:
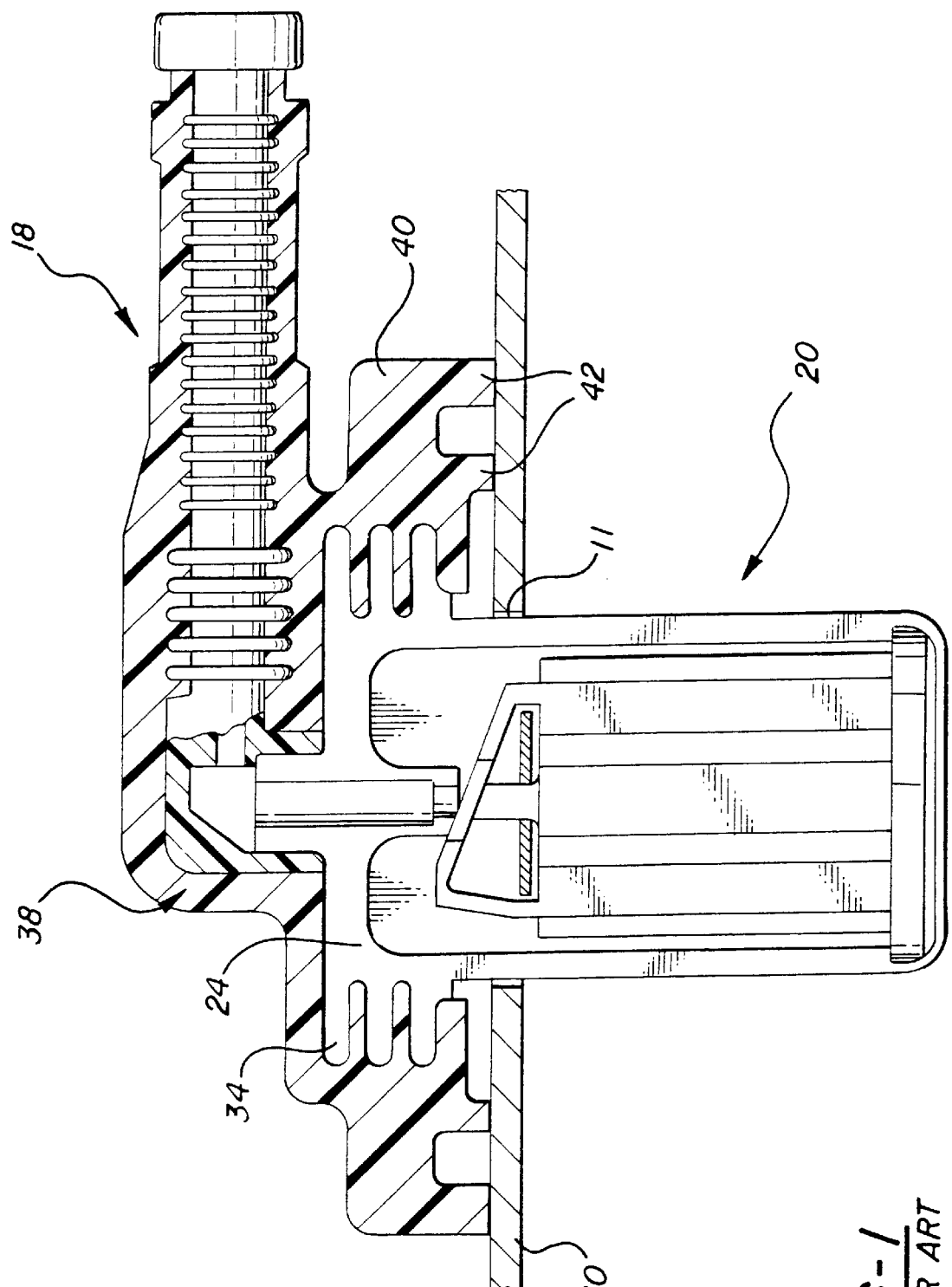
Figure 2:
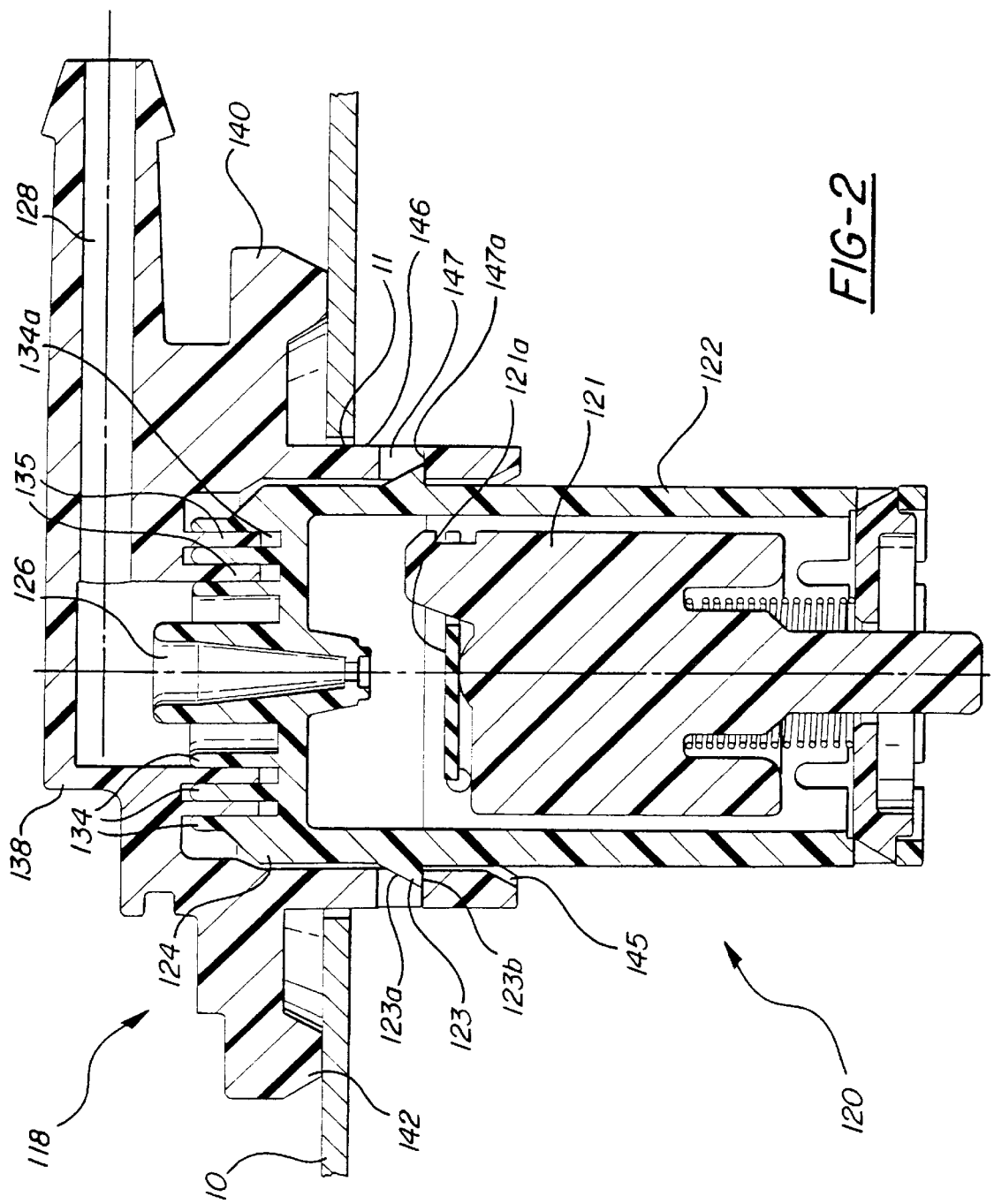

An illustrative example of a preferred form of the invention is shown in FIG. 2. A weldable vapor vent valve assembly 118 comprises a heat-resistant main valve body 120 having a lower portion 122 capable of being inserted through an aperture 11 in the fuel tank wall 10, and a weldable connector portion 138 secured to the upper end of the valve body. Fuel tank wall 10 comprises a plastic suitable for blow molding, such as polyethylene. Valve body 120 can be formed out of any suitable plastic material so long as it is sufficiently heat-resistant to withstand the temperatures achieved during welding and exposure to the fuel vapor laden environment of the tank. In the preferred embodiment valve body 120 is nylon, although other materials can be used. Weldable connector 138 is formed from a material that is weld-compatible with fuel tank wall 10. In the preferred embodiment both the fuel tank and weldable connector 138 are formed from polyethylene, although other possible combinations of weld-compatible materials will be known to those skilled in the art.

Valve body 120 defines a vent outlet 126, communicating fuel vapor between the hollow interior of lower valve body 122 and a conduit 128 shown extending at right angles from upper portion 124. Conduit 128 may be formed separately and attached to weldable connector 138, or may be formed integrally with weldable connector 138 as illustrated in FIG. 2.

The valve structure used in valve body 120 can comprise almost any valve structure known in the art, and is not critical to the present invention. In the illustrated example of FIG. 2, the valve structure is a known type of liquid level responsive float mechanism in which a spring-biased float 121 supporting a peelaway type valve element 123 on its upper end is raised against and lowered away from vent outlet 126 to close and open vapor flow as liquid fuel level in the tank rises and falls. By way of example only, valve structure of the type illustrated at 121 in FIG. 2 is described in greater detail in U.S. Pat. No. 5,313,977. Other types of liquid level responsive valve structures can be used with the weldable vent valve assembly of the present invention for different purposes not addressed herein, including but not limited to onboard refueling vapor recovery, rollover shutoff functions, and fill control functions.

Weldable connector 138 and valve body 120 are assembled and sealed against liquid and vapor leaks by interlocking sets of vertical ribs 134, 135 formed on the upper end of valve body 120 and the inside surface of connector 138, respectively. Interlocking vertical ribs 134, 135 comprise ring-like flanges of material formed integrally with and extending from the valve body and the weldable connector. It may be possible to attach ribs 134, 135 to the valve body and the weldable connector subsequent to their being molded, but integrally molded ribs are preferred.

Illustrated ribs 134, 135 are shown as continuous, concentric rings of material extending from the valve body and the weldable connector. In the illustrated embodiment, two weldable ribs 135 are shown inserted into and sandwiched between three valve body ribs 134. It will be understood by those skilled in the art that the total number of ribs 134 and 135 may vary depending on the size of the valve assembly, the desired strength of the mechanical connection between the weldable connector and the valve body, and the desired length of the anti-leak labyrinth established between the interlocking ribs. The preferred structure for sealing is to have at least one rib from each of the weldable connector and the valve body sandwiched by two ribs from the other. This will insure sealing even if one material has a greater dimensional change due to thermal or fuel swell effects. The minimum number of upstanding valve body ribs 134 is two, with a matching minimum of one weldable rib 135 so that each weldable rib 135 is trapped between two valve body ribs 134.

The width or thickness of weldable ribs 135 is preferably slightly greater than the spacing 134a between adjacent valve body ribs 134, thereby creating an interference fit between ribs 135 and ribs 134, in which weldable ribs 135 are deformed to provide a fluid- and vaportight seal with ribs 134.

It will be understood from FIG. 2 that the interlocking, sealing fit between ribs 134 and 135 not only prevents fuel vapor leakage from vent outlet 126 out through the interface of weldable connector 138 and valve body 120 to the surroundings, but further prevents liquid fuel from entering outlet 128 from the fuel tank between the interface of the weldable connector and the valve body.

It may be desirable in some circumstances to enhance the interlocking, sealing fit between ribs 134 and 135 beyond that achieved by the deformable nature of ribs 135 and the interference fit between them. For example, it may be desirable in some applications to apply an adhesive or other bonding agent to one or both sets of ribs 134, 135 prior to assembling them in a push-fit. It may also be possible in some applications to heat or cool one or both sets of ribs 134, 135 to improve the sealing fit between them. However, the preferred arrangement is a straight-forward interference fit between the ribs as described above.

While the interlocking fit between ribs 134 and 135 may be sufficient in some circumstances to hold weldable connector 138 and valve body 120 together mechanically, it will typically be desirable to provide additional locking structure between the two components, for example as shown in the illustrated embodiment at 123, 146. In the illustrated embodiment, the sidewall of valve body 120 is provided with beveled tabs 123 which first push aside the ends of a flexible sleeve 146 extending downwardly from weldable connector 138 over and around a portion of valve body 120, and then lock into place in suitably spaced apertures 147. Inserting the valve body 120 into sleeve 146 may be enhanced by beveling regions 145 on the lower end of the sleeve. The relative heights of tabs 123 and apertures 147 is designed to allow for a predetermined axial length of insertion of ribs 135 between ribs 134 before tabs 123 lock into apertures 147 on the sleeve.

Once weldable connector 138 has been assembled to valve body 120 as described above, in a simple axial push-fit without the need for additional operations such as overmolding, and without the need for any additional structure beyond that incorporated directly and integrally into the weldable connector and the valve body, the valve assembly can be inserted through aperture 11 in fuel tank wall 10 and welded to the fuel tank with weld feet 142 in known fashion.

It will be understood by those skilled in the art that the foregoing illustrated example of a preferred embodiment of the invention may be modified by those skilled in the art without departing from the scope of the invention as defined in the following claims. For example, the type of valve body 120 and its internal valve structure 121, 123 can vary, and can comprise almost any known valve structure capable of withstanding weld temperatures. The exact size and shape of the weldable connector can vary, depending on the desired weld attachment to the fuel tank and the types of outlet connections established with outlet structures such as that shown by way of example at 128. The number and size of vertical interlocking ribs 134, 135 can also vary depending on the particular application.

Accordingly, the invention claimed is:

1. A weldable vent valve assembly capable of being welded to a polymeric fuel tank, the vent valve assembly comprising:

a main valve body comprising a polymer material not suitable for welding to the fuel tank, the main valve body having a lower portion adapted to extend into the fuel tank through an aperture, the main valve body defining a vapor flow path from the interior to the exterior of the fuel tank through a vertical vent outlet in an upper end wall of the main valve body;

a weldable connector adapted to be assembled to the main valve body, the weldable connector comprising a polymer material suitable for welding to the fuel tank, at least a portion of the weldable connector designed to be in contact with the fuel tank for welding to the fuel tank when the weldable connector is assembled to the main valve body and the main valve body is operatively positioned in the fuel tank aperture; and, a first number of spaced, continuous, concentric vertical ribs being formed on a lower surface of the weldable connector, and a second number of spaced, continuous, concentric vertical ribs being formed on an outer surface of the upper end wall of the main valve body around the vertical vent outlet, the vertical ribs on the weldable connector and on the main valve body adapted to mate axially in an interlocking, sealing fit such that at least one vertical rib from the weldable connector is sandwiched between two vertical ribs from the main valve body, and at least one vertical rib from the main valve body is sandwiched between two vertical ribs from the weldable connector.

2. The weldable vent valve of claim 1, further including mating locking structure formed on the valve body and on the weldable connector apart from the vertical ribs, for providing an axial locking connection between the weldable connector and the valve body apart from the vertical ribs.

3. The weldable vent valve assembly of claim 1, wherein the at least one vertical rib on the weldable connector has a width greater than the spacing between the two vertical ribs from the valve body between which the at least one vertical rib on the weldable connector is sandwiched, for a substantially fluid- and vaportight interference fit when the vertical ribs on the weldable connector and on the main valve body are mated axially.

4. The weldable vent valve assembly of claim 1, wherein the vertical ribs on the weldable connector and on the main valve body comprise ring-like circular flanges.

5. The weldable vent valve of claim 1, wherein the vertical ribs are formed integrally with and comprise the same polymer material as their respective weldable connector and main valve body.

6. A weldable vent valve assembly capable of being welded to a polymeric fuel tank, the vent valve assembly comprising:

a main valve body comprising a relatively hard, heat-resistant polymer material not suitable for welding to the fuel tank, the main valve body having a lower portion including a hollow interior adapted to communicate with the fuel tank and containing valve structure, the lower portion being adapted to extend into the fuel tank through an aperture, the main valve body further defining a vapor flow path from the hollow interior of the lower portion of the main valve body to the exterior of the fuel tank via a vertical vent outlet extending through an upper end wall in the main valve body;

a weldable connector adapted to be assembled to the main valve body, the weldable connector comprising a relatively soft polymer material suitable for welding to the fuel tank, at least a portion of the weldable connector being designed to be in contact with the fuel tank for welding to the fuel tank when the weldable connector is assembled to the main valve body and the main valve body is operatively positioned in the fuel tank aperture, the weldable connector further including a venting conduit adapted to be in vapor communication with the vertical vent outlet in the main valve body when the weldable connector is assembled to the main valve body; and, a first number of spaced, continuous, concentric vertical ribs being formed on a lower surface of the weldable connector around to the venting conduit, and a second number of spaced, continuous, concentric vertical ribs being formed on an outer surface of the upper end wall of the main valve body around the vent outlet, the vertical ribs on the weldable connector and on the main valve body adapted to mate axially in an interlocking, sealing fit such that at least one rib from the weldable connector is sandwiched between two ribs from the main valve body, and at least one rib from the main valve body is sandwiched between two ribs from the weldable connector, wherein the vertical ribs on the weldable connector comprise the relatively soft polymer material and are of a first width greater than the space between the vertical ribs on the main valve body, and the vertical ribs on the main valve body are formed from the relatively hard, heat resistant polymer material, for a substantially fluid-and vapor tight interference fit between the weldable connector and the main valve body around the venting conduit and vent outlet.

7. A weldable vent valve assembly capable of being welded to a polymeric fuel tank, the vent valve assembly comprising:

a main valve body comprising a polymer material not suitable for welding to the fuel tank, the main valve body having a lower portion adapted to extend into the fuel tank through an aperture, the main valve body defining a vapor flow path from the interior to the exterior of the fuel tank through a vertical vent outlet in an upper end wall of the main valve body;

a weldable connector adapted to be assembled to the main valve body, the weldable connector comprising a polymer material suitable for welding to the fuel tank, at least a portion of the weldable connector designed to be in contact with the fuel tank for welding to the fuel tank when the weldable connector is assembled to the main valve body and the main valve body is operatively positioned in the fuel tank aperture, the weldable connector having a venting conduit adapted to be placed in vapor communication with the vent outlet on the main valve body when the weldable connector and main valve body are assembled; and, a weldable connector interface on the upper end wall of the main valve body in surrounding relationship to the vent outlet, and a main valve body interface on the lower surface of the weldable connector in surrounding relationship to the venting conduit, the weldable connector interface and the main valve body interface respectively comprising mating sets of axially-interlocking vertical rib means which when axially interlocked provide a circuitous, labyrinth-type fluid and vapor seal surrounding the vapor communication between the vent outlet and venting conduit.

8. A method for assembling a non-weldable main valve body to a weldable connector to form a weldable vent valve assembly capable of being welded at the weldable connector portion to a polymeric fuel tank, comprising the following steps:

axially mating a plurality of vertical rib means on a lower surface of the weldable connector with a mating set of vertical rib means on an upper surface of the main valve body, such that the vertical rib means on the weldable connector and on the main valve body interlock to form a circuitous, labyrinth-type seal interface in surrounding relationship to a vapor communication path between a vent outlet on the main valve body and a venting conduit on the weldable connector.

9. A method for axially mating a main valve body of the type comprising a polymer material not suitable for welding to a polymeric fuel tank to a weldable connector comprising a polymer material suitable for welding to the fuel tank to form a weldable vent valve assembly, the main valve body having a lower portion adapted to extend into the fuel tank through an aperture and defining a vapor flow path from the interior to the exterior of the fuel tank through a vertical vent outlet in an upper end thereof, with at least a portion of the weldable connector being designed to be in contact with the fuel tank for welding to the fuel tank when the main valve body is operatively positioned in the fuel tank aperture, comprising the following steps:

provinding the weldable connector with a first number of spaced, continuous, concentric vertical ribs formed on a lower surface thereof;

providing a second number of spaced, continuous, concentric vertical ribs on an outer surface of the upper end of the main valve body around the vertical vent outlet;

axially mating the vertical ribs on the weldable connector with the vertical ribs on the main valve body such that at least one vertical rib from the weldable connector is sandwiched in a sealing fit between two vertical ribs from the main valve body, and at least one vertical rib from the main valve body is sandwiched in a sealing fit between two vertical ribs from the weldable connector.

* * * * *

UNITED STATES PATENT AND TRADEMARK OFFICE
CERTIFICATE OF CORRECTION

PATENT NO. : 6,035,883
DATED : March 14, 2000
INVENTOR(S) : Benjey

It is certified that error appears in the above-identified patent and that said Letters Patent is hereby corrected as shown below:

In the drawings:

In Fig. 2, delete the right-most occurrence of numeral "123" and replace it with --121a--;

Col. 2, line 60, after "extending", insert --through and exiting at--;

Col. 2, line 64, after "2.", insert --Venting conduit 128 opens onto the lower surface of weldable connector 138 for vapor communication with vent outlet 126 on valve body 120.--;

Col. 3, line 3, delete "123", and insert --121a--;

Col. 4, line 31, delete "123", and insert --121a--;

Col. 5, line 6, after "valve", insert --assembly--;

Col. 5, line 8-9, delete "for providing an axial locking connection between" and insert --the mating locking structure being adapted to axially lock--;

Col. 5, line 22, after "valve", insert --assembly--;

Col. 5, line 49, after "conduit", insert --having an opening on a lower surface of the weldable connector--;

Col. 5, line 55, after "around", delete "to";

Col. 5, line 55, after "venting conduit", insert --opening--;

UNITED STATES PATENT AND TRADEMARK OFFICE
CERTIFICATE OF CORRECTION

PATENT NO. : 6,035,883
DATED : March 14, 2000
INVENTOR(S) : Benjey

It is certified that error appears in the above-identified patent and that said Letters Patent is hereby corrected as shown below:

Col. 6, line 1, delete "space" and insert --spacing--;
Col. 6, line 6, after "conduit", insert --opening--;

Col. 6, line 28, after "conduit", insert --having an opening on a lower surface of the weldable connector--;

Col. 6, line 36, after "conduit", insert --opening--;

Col. 6, line 40, delete "rib means" and insert --ribs--;

Col. 6, line 49, delete "rib means" and insert --ribs--;

Col. 6, line 51, delete "rib means" and insert --ribs--; and

Col. 6, line 52, delete "rib means" and insert --ribs--.

Signed and Sealed this

Twentieth Day of February, 2001

*Attest:*

NICHOLAS P. GODICI

*Attesting Officer*  *Acting Director of the United States Patent and Trademark Office*